3,346,361
DESTROYING UNDESIRED VEGETATION WITH N-HALOMETHYLCARBONYL - 3 - AZABICYCLO [3.2.2]NONANES
John J. D'Amico, Dunbar, W. Va., assignor to Monsanto Company, St. Louis, Mo., a corporation of Delaware
No Drawing. Filed Sept. 27, 1965, Ser. No. 490,701
6 Claims. (Cl. 71—88)

This application is a continuation-in-part of Ser. No. 278,997 filed May 8, 1963.

This invention relates to destroying vegetation with N-halomethylcarbonyl-3 - azabicyclo[3.2.2]nonanes which are a new class of compounds.

As illustrative of the preparation, a mixture of 37.5 grams (0.3 mole) of 3-azabicyclo[3.2.2]nonane, 30.4 grams (0.3 mole) of triethylamine, and 500 ml. of ethyl ether is prepared and 33.9 grams (0.3 mole) of chloracetyl chloride added dropwise at 25°–30° C. The reactants are then stirred at 25°–30° C. for 24 hours, 400 ml. of water then added, and stirring continued for an additional 15 minutes. The product is filtered to remove a small amount of impurities, the ether layer separated, washed with water until neutral to litmus, and dried over sodium sulfate. The ether is removed in vacuo at a maximum temperature of 30° C. The resulting solid is air-dried at 25°–30° C. The product, N-chloromethylcarbonyl-3-azabicyclo[3.2.2]nonane, is obtained in 71% yield as a light yellow solid melting at 63°–64° C. After recrystallization from heptane, the M.P. is 74°–75° C. It is soluble in common organic solvents but insoluble in water. Analysis gives 7.13% nitrogen compared to 6.95% calculated for $C_{10}H_{16}ClNO$. Substituting an equal molecular quantity of bromoacetyl bromide or iodoacetyl bromide for chloracetyl chloride in the foregoing procedure yields N-bromomethylcarbonyl-3-azabicyclo[3.2.2]-nonane and N-iodomethylcarbonyl-3-azabicyclo[3.2.2]-nonane, respectively.

Alternatively, N-iodomethylcarbonyl - 3 - azabicyclo [3.2.2]nonane may be obtained from the corresponding chloro compound in the following manner: To a stirred solution of 40.4 grams (0.2 mole) of recrystallized N-chloromethylcarbonyl-3-azabicyclo[3.2.2]nonane in 300 mole) of potassium iodide. The stirred reaction mixture mle) of potassium iodide. The stirred reaction mixture is heated at reflux (56°–58° C.) for 24 hours. After cooling to 5° C., 700 grams of ice water is added and the mixture stirred at 0°–10° C. for 30 minutes. The resulting solid is collected by filtration, washed with 200 ml. of cold water, and air-dried at 25°–30° C. The product, N-iodomethylcarbonyl-3-azabicyclo[3.2.2]nonane, is obtained in 86.5% yield melting at 57°–59° C. After recrystallization from ethyl alcohol, the melting point is 61.0°–61.5° C. Analysis gives 4.7% nitrogen which is the value calculated for $C_{10}H_{16}INO$.

The halogen in these compounds is quite reactive, and consequently they are useful intermediates for organic synthesis. Moreover, they are extremely effective herbicides. They are useful as pre-emergence herbicides, and they are also toxic to foliage. The table below illustrates herbicidal activity. The toxicant, in this instance N-chloromethylcarbonyl-3-azabicyclo[3.2.2]nonane, is emulsified in water and the emulsion applied as a spray. In the foliage of the plants and the effect recorded. In the pre- of active ingredient shown in the table is applied to the foliage of the plants and the effect recorded. In the pre- emergence tests the spray is applied to the ground of seeded plots before the grass or other plants emerge. The dosages are expressed in pounds per acre. The following phytotoxicity rating key is used:

|  | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 |  |

TABLE I

| Plant | Contact 0.5% Conc. | Pre-emergent Dosage, Lbs./Acre | | | |
|---|---|---|---|---|---|
| | | 5 | 1 | 0.25 | 0.05 |
| Morning glory | 3 | 2 | 1 | 0 | 0 |
| Wild oat | 2 | 3 | 2 | 1 | 1 |
| Brome grass | 2 | 3 | 3 | 1 | 1 |
| Rye grass | 1 | 3 | 3 | 2 | 1 |
| Radish | 4 | 2 | 1 | 0 | 0 |
| Sugar beet | 1 | 3 | 3 | 1 | 0 |
| Cotton | | 1 | 1 | 1 | 0 |
| Corn | | 1 | 0 | 0 | 0 |
| Foxtail | 3 | 3 | 3 | 3 | 3 |
| Barnyard grass | | 3 | 3 | 3 | 3 |
| Crab grass | 3 | 3 | 3 | 3 | 2 |
| Pigweed | 4 | 3 | 3 | 2 | 0 |
| Soybean | 3 | 2 | 0 | 1 | 0 |
| Wild buckwheat | 3 | 2 | 1 | 0 | 0 |
| Tomato | 4 | 3 | 1 | 0 | 0 |
| Sorghum | 3 | 3 | 3 | 1 | 0 |
| Rice | | 3 | 3 | 1 | 0 |

From the above table it will be seen that this toxicant completely controls foxtail, barnyard grass, and crab grass in pre-emergent application at dosages as low as one-fourth pound per acre and completely controls foxtail and barnyard grass at 0.05 pound per acre but is virtually non-toxic to cotton and corn at all concentrations. It will be further noted that the toxicant exerts considerable contact activity. Although chlorine is preferred for economic reasons, the corresponding bromine and iodine compounds are effective herbicides.

Herbicidal compositions are prepared by admixing the active ingredient with a herbicidal adjuvant as carrier to provide formulations in liquid or solid form. Solid compositions in the form of dusts or granules are prepared by admixing the active component with finely divided solid carriers, as, for example, talc, clay, pyrophyllite, silica, and fuller's earth. Usually the toxicant will be present only in minor proportion in combination with the major proportion of carrier. Liquid compositions are prepared in the usual way by admixing the active ingredient with a liquid diluent. As pointed out above, the toxicants are soluble in common organic solvents. Petroleum fractions rich in aromatic hydrocarbons are desirable carriers.

Whether in the form of solids or liquids the herbicidal compositions may also include a surface-active agent. This is advantageous for the compounding of emulsifiable concentrates. As surface-active agents there may be employed soft or hard sodium or potassium soaps, alkylated aromatic sulfonates, such as sodium dodecylbenzenesulfonate, and dibutyl ammonium dodecylbenzenesulfonate, alkali metal salts of sulfated fatty alcohols, ethylene oxide condensation products of alkyl phenols, ethylene oxide condensation products of tall oil, and ethylene oxide condensation products of higher mercaptans. In general, the composition applied as a herbicide will contain concentration of active ingredient within the range of 0.05 to 10% weight. For pre-emergence control amounts within the range of 0.01 to 100 pounds per acre will be satisfactory for most purposes.

N-iodomethylcarbonyl-3 - azabicyclo[3.2.2]nonane is preferably used as a contact spray. Applied at a concentration of 0.02% to two-week-old plants, the phytotoxicity ratings observed are as follows:

TABLE II

| Plant: | Phytotoxicity Rating |
|---|---|
| Morning glory | 0 |
| Wild oat | 4 |
| Brome grass | 3 |
| Rye grass | 3 |
| Radish | 4 |
| Sugar beet | 4 |
| Cotton | 3 |
| Corn | 2 |
| Foxtail | 4 |
| Barnyard grass | 1 |
| Crab grass | 3 |
| Pigweed | 4 |
| Soybean | 1 |
| Wild buckwheat | 4 |
| Tomato | 4 |
| Sorghum | 4 |
| Rice | 2 |

In pre-emergence tests as described previously, N-iodomethylcarbonyl - 3 - azabicyclo[3.2.2]nonane completely controls foxtail, crab grass, and pigweed at five pounds per acre.

Fungicidal properties of N-iodomethylcarbonyl-3-azabicyclo[3.2.2]nonane are demonstrated by observing the fungitoxicity of the chemical to the spores of *Venturia inaequalis*, the causal agent of apple scab, and Phytophthora infestans, the causal agent of late blight of solanaceous crops. Spores of the fungus to be tested are harvested. A suspension of the spores is diluted with a dispersion of the test chemical. The inhibition of spore germination is evaluated after suitable periods of incubation. If a chemical completely inhibits spore germination, it is assigned the numeral 1 meaning that no germ tube forms or, if one forms, it is one-half or less than the length of the spore. At a concentration of 10 parts per million of the test chemical, a rating of 1 is observed with spores of either fungus.

The fungitoxicity of the chemical to soil fungi is demonstrated by incorporating the pathogens in sterile soil, drenching the chemical over the soil surface, and observing the degree to which mycelial growth on the soil surface is inhibited. At a concentration of 30 parts per million on a soil weight basis, N-iodomethylcarbonyl-3-azabicyclo[3.2.2]nonane completely inhibits growth of *Pythium ultimum* or *Rhizoctonia solani*.

It is intended to cover all changes and modifications of the examples of the invention herein chosen for purposes of disclosure which do not constitute departures from the spirit and scope of the invention.

What is claimed is:

1. A herbicidal composition comprising a minor but herbicidally effective proportion of N-halomethylcarbonyl-3-azabicyclo[3.2.2]nonane where the halogen is selected from the group consisting of chlorine, bromine, and iodine and a major proportion of inert herbicidal adjuvant as carrier.

2. A herbicidal composition comprising a minor but herbicidally effective proportion of N-chloromethylcarbonyl-3-azabicyclo[3.2.2]nonane and a major proportion of inert herbicidal adjuvant as carrier.

3. An emulsifiable herbicidal composition comprising an aromatic petroleum fraction having dissolved therein a herbicidally effective concentration of N-chloromethylcarbonyl-3-azabicyclo[3.2.2]nonane and a small amount of surface-active agent.

4. The method of destroying undesired vegetation which comprises applying thereto a phytotoxic concentration of N-halomethylcarbonyl-3-azabicyclo[3.2.2]nonane where the halogen is selected from the group consisting of chlorine, bromine, and iodine.

5. The method of destroying undesired vegetation which comprises applying thereto a phytotoxic concentration of N-chloromethylcarbonyl-3-azabicyclo[3.2.2]nonane.

6. The method of destroying undesired vegetation which comprises applying to the soil medium a phytotoxic amount of N-chloromethylcarbonyl-3-azabicyclo[3.2.2]nonane.

References Cited

UNITED STATES PATENTS

| 3,133,808 | 5/1964 | Hamm | 71—2.3 |
| 3,187,000 | 6/1965 | D'Amico | 71—2.5 |

LEWIS GOTTS, *Primary Examiner.*

JAMES O. THOMAS, JR., *Examiner.*